A. E. NOONAN.
CONNECTION FOR FLOAT BALLS AND FLOAT VALVES.
APPLICATION FILED APR. 14, 1909.
938,071.
Patented Oct. 26, 1909.
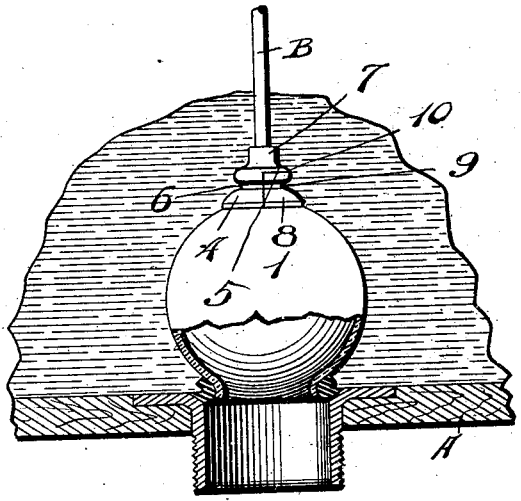
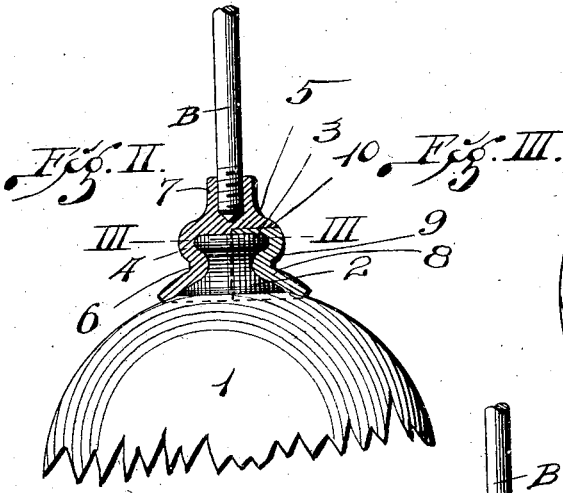
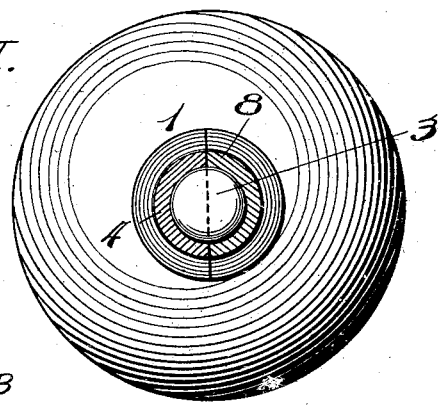
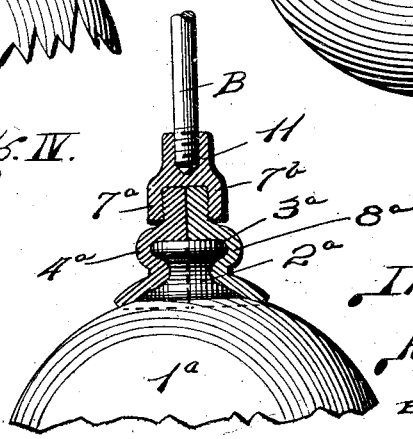
ATTEST.
E. M. Harrington
E. B. Pierce
INVENTOR.
A. E. Noonan.
BY E. S. Knight ATTY

UNITED STATES PATENT OFFICE.

ANTHONY E. NOONAN, OF ST. LOUIS, MISSOURI, ASSIGNOR TO L. M. RUMSEY MFG. CO., OF ST. LOUIS, MISSOURI, A CORPORATION.

CONNECTION FOR FLOAT-BALLS AND FLOAT-VALVES.

938,071.

Specification of Letters Patent.

Patented Oct. 26, 1909.

Application filed April 14, 1909. Serial No. 489,932.

*To all whom it may concern:*

Be it known that I, ANTHONY E. NOONAN, a citizen of the United States of America, residing at the city of St. Louis, in the State of Missouri, have invented certain new and useful Improvements in Connections for Float-Balls and Float-Valves, of which the following is a full, clear, and exact description, reference being had to the accompanying drawings, forming part of this specification.

My invention relates to a connection for the attachment of float balls and float valves of the description used in flushing tanks, and the invention has for its object the production of a connection of this kind whereby the rods or carrying members may be attached to the floats without producing holes in the floats for the reception of the rods or carrying members.

Floats of the description referred to have heretofore commonly been made of metal, for instance, copper, rubber, or other material that is of such a nature that the rods or carrying members may be readily fitted to the floats when holes are provided in the floats to receive the rods or carrying members. The floats so made have frequently proven unsatisfactory for the reason that they become punctured during their use and therefore unfit for further service. By my improvement, I furnish a connection that will permit of the use of floats made of glass, porcelain, or analogous material, and which is not subject to becoming punctured during the use of the float.

Figure I is in part a fragmentary section of a flushing tank with a float valve therein having my connection applied to it, the float valve being shown partly in elevation and partly in section. Fig. II is in part an elevation of the upper portion of the float valve of a float, and in part a longitudinal section of my connection applied to the valve of the float. Fig. III is a cross section taken on line III—III, Fig. II. Fig. IV is a view similar to Fig. II, illustrating a modification.

In the accompanying drawings, I have illustrated in Fig. I a float 1 of a float valve as it appears in a flushing tank designated A, and at the outlet of said tank. This float valve is made of glass, porcelain, or analogous material, and is provided at its upper end with a neck 2 formed with a flared body that is made integral with the float and is provided at its end with a head 3 of greater diameter than the portion of the neck adjoining said head.

My connection, which is adapted to be fitted to the neck of the float, comprises two sections 4 and 8, preferably of metal, which are applied to the neck of the float in such manner as to firmly grip it. The section 4 of the connection member has an outer portion 5 that extends across the head of the neck 2, and a lower inwardly extending segmental portion 6 that is fitted against the head of the neck and the portion of the neck beneath said head in such manner as to occupy the reduced portion of the neck beneath the head, as seen in Fig. II. The section 8 of the connection has a segmental lower portion 9 that is similar in shape to the shape of the lower portion of the section 4, and fits the neck of the float in a manner similar to the fitting of the lower portion of the section 4, in order that when said sections are united they will combinedly grip the neck of the float between them. The section 8 of the connection is provided at its upper end with a horizontal portion 10 that extends partly across the head of the neck of the float, and is seated beneath the outer portion 5 of the section 4 between said outer portion and the head of the neck. Section 4 of the connection is provided with a neck 7 that extends upwardly from the outer portion 5 of said section and to which a rod or carrier B is attached, attachment of the rod being preferably provided for by producing a screw-threaded bore in the neck 7 into which the rod may be screwed. The sections of my connection may be united to each other in any suitable manner, but I prefer as the simplest form of uniting them, to solder them together throughout their abutting surfaces, or at the necessary number of points for their permanent attachment to each other.

In Fig. IV I have shown a modification in which $1^a$ designates the float, $2^a$ the neck projecting from said float, and $3^a$ the head of said neck. The float in this modification is similar to the float previously described, but the connection differs from the hereinbefore described connection in that the sections $4^a$ and $8^a$ of said connection are similar to each other in shape, each section having a lower segmental portion that grips the neck of the float, outer portions that extend in similar degree across the head of the neck of the float, to the respective sections terminating in segmentary neck portions 7ª and 7ᵇ that combinedly furnish the neck of the section. The neck members are screw-threaded externally to receive a cap or nut 11 which serves to hold the connection sections assembled and to provide for their lower portions being held in a clamped condition around the neck of the float. The cap or nut 11 receives the rod or carrier B in a manner similar to that in which the rod is received by the neck 7 of the connection section 4 in the previously described construction.

The herein described connection is applicable to floats of all kinds used in flushing tanks, whether they are float valves or floats for controlling valves, and I therefore do not wish to limit myself to the use of the connection upon the float of a float valve.

I claim:

1. The combination with a float ball or valve having a headed neck, of a sectional rod connection conforming to and embracing said neck.

2. The combination with a float ball or valve having a neck comprising a flared body and a head, of a rod connection conforming to and embracing the body and head of said neck.

3. The combination with a float ball or valve having a neck comprising a flared body and a head, of a sectional rod connection conforming to and embracing the body and head of said neck.

4. The combination with a float ball or valve having a neck comprising a flared body with a head at its outer end, and a rod connection comprising a plurality of sections mating with each other and conforming to and embracing said neck between its head and the ball or valve.

5. The combination with a float ball or valve having a headed neck formed with a flared body, and a pair of mating segmental rod connection members conforming to and embracing said headed neck.

6. The combination with a float ball or valve having a headed neck formed with a flared body, and a rod connection comprising a segment shaped section fitted to said headed neck and provided with a neck to receive a rod, and a second section fitted to the headed neck of the ball or valve and attached to the first named section.

ANTHONY E. NOONAN.

In the presence of—
E. M. HARRINGTON,
E. B. LINN.